US012598226B2

(12) United States Patent
McNab et al.

(10) Patent No.: US 12,598,226 B2
(45) Date of Patent: Apr. 7, 2026

(54) APPARATUS AND METHOD FOR INTERACTIONS WITH INDUSTRIAL EQUIPMENT

(71) Applicant: GE INTELLIGENT PLATFORMS INC., Charlottesville, VA (US)

(72) Inventors: Keith George McNab, Albany, NY (US); Daniel White Sexton, Niskayuna, NY (US); Richard A. Carpenter, Charlottesville, VA (US); Wesley Michael Skeffington, Niskayuna, NY (US); Ward Linnscott Bowman, Foxboro, MA (US); Brian Scott Courtney, Lisle, TX (US)

(73) Assignee: INTELLIGENT PLATFORMS, LLC, Charlottesville, VA (US)

( * ) Notice: Subject to any disclaimer, the term of this patent is extended or adjusted under 35 U.S.C. 154(b) by 29 days.

(21) Appl. No.: 17/113,830

(22) Filed: Dec. 7, 2020

(65) Prior Publication Data

US 2021/0092190 A1 Mar. 25, 2021

Related U.S. Application Data

(63) Continuation of application No. 15/315,556, filed as application No. PCT/US2015/031658 on May 20, 2015, now Pat. No. 10,862,969.

(Continued)

(51) Int. Cl.
*H04L 67/02* (2022.01)
*H04L 61/2503* (2022.01)
(Continued)

(52) U.S. Cl.
CPC .......... *H04L 67/02* (2013.01); *H04L 61/2503* (2013.01); *H04L 67/12* (2013.01); *H04W 4/38* (2018.02)

(58) Field of Classification Search
CPC ..... H04L 67/12; H04L 61/2503; H04L 67/02; H04W 4/38
See application file for complete search history.

(56) References Cited

U.S. PATENT DOCUMENTS

| 6,112,246 A | * | 8/2000 | Horbal | H04L 9/40 |
| | | | | 707/E17.112 |
| 6,463,352 B1 | * | 10/2002 | Tadokoro | G05B 19/4187 |
| | | | | 702/33 |

(Continued)

FOREIGN PATENT DOCUMENTS

| CN | 1852170 A | 10/2006 |
| CN | 1941779 A | 4/2007 |

(Continued)

OTHER PUBLICATIONS

First Chinese Office Action for Application No. 201580032975.5, dated Mar. 20, 2019.

(Continued)

*Primary Examiner* — Shirley X Zhang
(74) *Attorney, Agent, or Firm* — MARSHALL, GERSTEIN & BORUN LLP

(57) ABSTRACT

Systems and approaches for interacting with industrial equipment are provided that include an interface having an input and an output, and a processor coupled to the interface. The processor is configured to link a uniform identification construct to a device and receive a request to access the uniform identification construct. The processor is further configured to translate the uniform identification construct into an internet protocol (IP) address and route the request to the device having the uniform identification construct according to the IP address via the output.

15 Claims, 4 Drawing Sheets

Related U.S. Application Data

(60) Provisional application No. 62/013,724, filed on Jun. 18, 2014.

(51) Int. Cl.
    *H04L 67/12*     (2022.01)
    *H04W 4/38*      (2018.01)

(56) References Cited

U.S. PATENT DOCUMENTS

| | | | |
|---|---|---|---|
| 6,802,053 B1 | 10/2004 | Dye et al. | |
| 7,035,898 B1 | 4/2006 | Baker | |
| 7,152,116 B1* | 12/2006 | Austin | H04L 61/30 |
| | | | 709/245 |
| 7,606,890 B1 | 10/2009 | Baier et al. | |
| 7,689,669 B2 | 3/2010 | Lange et al. | |
| 2002/0156838 A1 | 10/2002 | Batke et al. | |
| 2003/0018654 A1 | 1/2003 | Miwa et al. | |
| 2005/0264429 A1 | 12/2005 | Hermary et al. | |
| 2007/0061455 A1 | 3/2007 | Callaghan | |
| 2007/0112961 A1* | 5/2007 | Brun | H04L 63/102 |
| | | | 709/227 |
| 2007/0186011 A1* | 8/2007 | Batke | H04L 41/0226 |
| | | | 709/246 |
| 2009/0222541 A1 | 9/2009 | Monga et al. | |
| 2011/0046754 A1* | 2/2011 | Bromley | G05B 19/41885 |
| | | | 700/83 |
| 2013/0219064 A1 | 8/2013 | Zhang et al. | |
| 2014/0088749 A1* | 3/2014 | Ellis | H04L 69/18 |
| | | | 726/19 |
| 2014/0188933 A1 | 7/2014 | Chomik et al. | |
| 2015/0066979 A1* | 3/2015 | Zhang | G06F 16/245 |
| | | | 707/769 |

FOREIGN PATENT DOCUMENTS

| | | | |
|---|---|---|---|
| CN | 101436148 A | 5/2009 | |
| CN | 102103626 A | 6/2011 | |
| CN | 102136933 A | 7/2011 | |
| CN | 102668509 A | 9/2012 | |
| CN | 102947824 A | 2/2013 | |
| CN | 103236960 A | 8/2013 | |
| CN | 103299601 A | 9/2013 | |
| CN | 103546593 A | 1/2014 | |
| EP | 1 526 702 A1 | 4/2005 | |
| EP | 1 770 528 A2 | 4/2007 | |
| WO | WO-00/25221 A2 | 5/2000 | |
| WO | WO-2012/080768 A1 | 6/2012 | |
| WO | WO-2014/000756 A1 | 1/2014 | |

OTHER PUBLICATIONS

Second Chinese Office Action for Application No. 201580032975.5, dated Aug. 26, 2019.

Decision on Rejection for Chinese Application No. 201580032975.5, dated Nov. 28, 2019.

Office Action for European Application No. 15809891.3, dated Feb. 10, 2021.

Extended European Search Report for Application No. 21217163.1, dated Mar. 10, 2022.

First Chinese Office Action for Application No. 202110856299.0, dated Jun. 28, 2023.

Second Chinese Office Action for Application No. 202110856299.0, dated Nov. 30, 2023.

Third Chinese Office Action for Application No. 202110856299.0, dated Mar. 28, 2024.

* cited by examiner

APPARATUS AND METHOD FOR INTERACTIONS WITH INDUSTRIAL EQUIPMENT

CROSS-REFERENCE TO RELATED APPLICATIONS

This application is a continuation application that claims the benefit of priority from U.S. patent application Ser. No. 15/315,556 entitled "Apparatus and Method for Interactions with Industrial Equipment," filed Dec. 1, 2016, which is a US National Phase of International Application Serial No. PCT/US15/31658 entitled "Apparatus and Method for Inter-actions with Industrial Equipment," which claims the benefit of U.S. Provisional Application 62/013,724 entitled "Appa-ratus and Method for Interactions with Industrial Equip-ment," filed on Jun. 8, 2014, the entire disclosures of each of which are hereby expressly incorporated by reference herein.

BACKGROUND

The subject matter disclosed herein generally relates to interactions between users, industrial software, and indus-trial equipment.

Brief Description of the Related Art

Various systems deploy sensors that are used to obtain different types of information. These systems also some-times include actuators that manipulate particular devices within these systems to achieve control objectives.

One type of system where these sensors and actuators are used involves industrial processes. To take one example, an industrial process may use water pumps and valves. The industrial process may have sensors that measure the tem-perature and flow of the water exiting the pump. The pumps may have actuators to turn them on and off.

Because the sensors and actuators are included in indus-trial processes, they are typically difficult to access. For instance, a user may need to go to the actual industrial plant to read the sensors or to actuate the actuators. This lack of convenience increases the cost of operating these sensors/actuators as well as increasing the cost of the entire indus-trial process.

The above-mentioned problems have resulted in some user dissatisfaction with previous approaches.

BRIEF SUMMARY

The approaches described herein relate uniform resource locators (URLs), uniform resource identifiers (URIs), or similar constructs and link these constructs to certain objects or access points. In one example, an I/O point (e.g., from a programmable logic controller (PLC) or digital control system (DCS)) is associated with a URL/URI address. In another example, an automation tag from a Supervisory Control and Data Acquisition (SCADA) system or Historian system is associated with a URL/URI address. In another example, an automation object (e.g., digitally representing a pump, valve, or other automation equipment or object) is associated with a URL/URI.

This present approaches provide for interacting with industrial equipment or information in the context of the modern Internet. The methodology uses Internet addresses (e.g., URLs, URIs, IPv4 addresses, and IPv6 addresses to mention a few examples) to expose a flat or structured namespace for industrial information. For example, any variable or structured data associated with sensors, personal computers, programmable logic controllers, distributed con-trol systems, specialty controllers, supervisory control and data acquisition (SCADA) systems, Historians, and other automation processes are exposed to access by a user via a URL, URI, IPv4 address or IPv6 address (to mention a few examples of address constructs).

In many of these embodiments, a uniform resource loca-tor (e.g., URL) is linked to a device (e.g., a sensor in an industrial process). A request to access the URL is made from a client based application such as a web browser. The URL is translated into an IP address, which allows the request to be routed to the device associated with the URL. The device processes the request with a response, which can include information sought by the requestor. In other examples, the IP address is associated with a set point, and this set point is changeable by utilizing the IP address to post the change.

In some approaches, an apparatus having an interface and a processor is provided. The processor is configured to link a construct with an industrial data object and receive a request via the input from an application to access the industrial data object by using the construct. The application may include at least one of a client-based application or a web-based server. The processor is then configured to respond to the request by routing the industrial data object to the application via the output. It is understood that any number of processors, located remotely or locally relative to each other, may be used in these approaches.

In many of these approaches, the construct comprises at least one of an Internationalized Resource Identifier (IRI), a uniform resource identifier (URI), a uniform resource loca-tor (URL), an IPv4 address, an IPv6 address, an IPv6 address associated with an IEEE 64 bit extended address, or a 16 bit address unique to a local Personal Area Network (PAN). The industrial data object may include at least one of a device, an attribute or a number of attributes within a device, or a property within an object. The device may include any number of sensors, actuators such as pumps or valves, or controllers.

In some approaches, the processor is further configured to request and receive permission to access the device. The processor may further translate the construct into an internet protocol (IP) address which may be associated with any number of set points and/or measurands. In some forms, this set point is changeable.

In yet other approaches, a construct is linked with an industrial data object. A request is then received from an application to access the industrial data object by using the construct. The request is then responded to by routing the industrial data object to the application.

In some of these forms, the step of linking the construct includes linking at least one of a uniform identification construct or a semantic construct (subject-predicate-object-triplet). Further, these approaches may initiate a request by the application using the construct to access the industrial data object. The construct may also be translated into an IP address.

BRIEF DESCRIPTION OF THE DRAWINGS

For a more complete understanding of the disclosure, reference should be made to the following detailed descrip-tion and accompanying drawings wherein.

Figure 1:
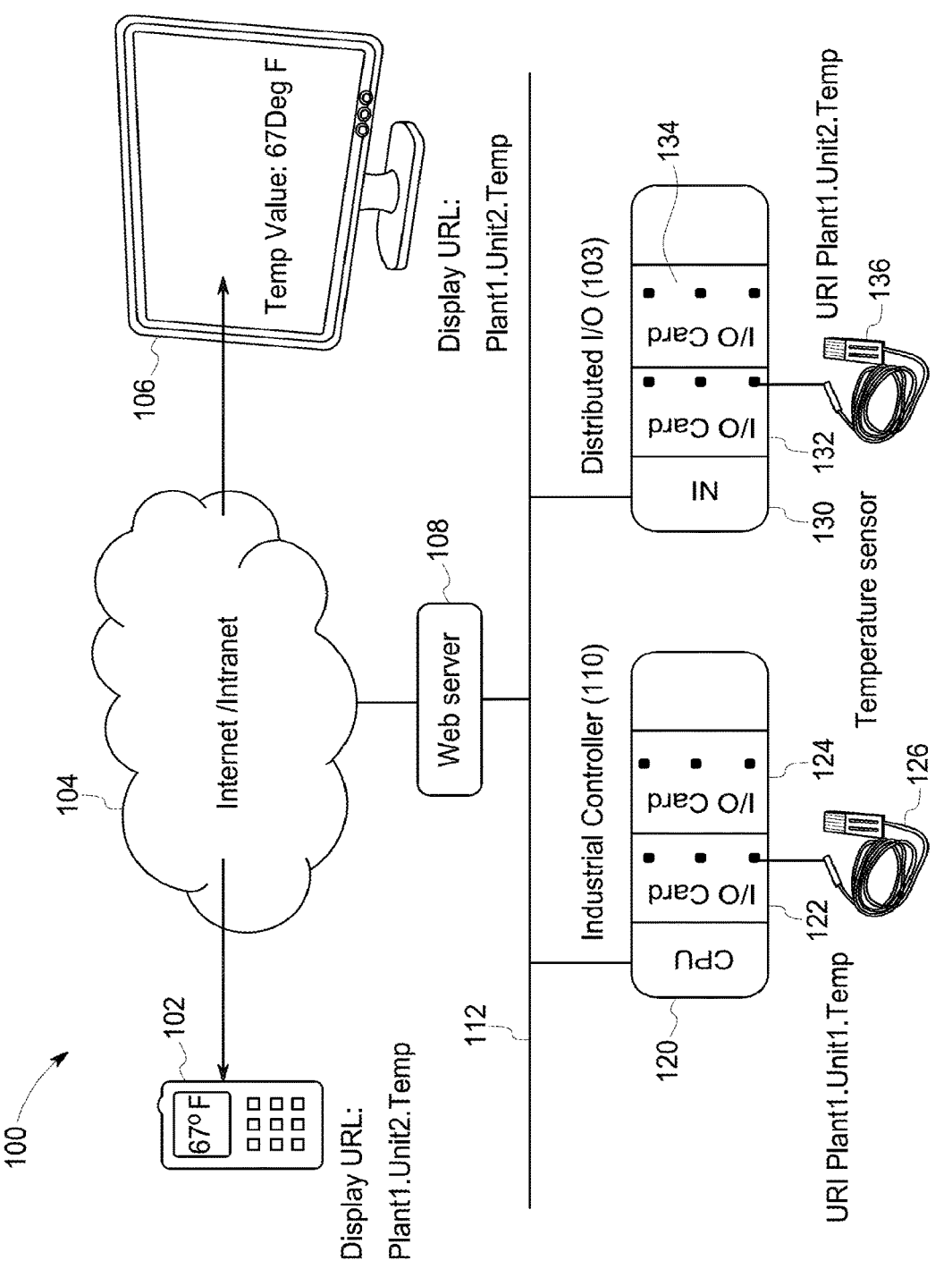
FIG. 1 comprises a block diagram of a system where URLs (or other similar constructs) are linked to various aspects of industrial processes according to various embodiments of the present invention.

Skilled artisans will appreciate that elements in the figures are illustrated for simplicity and clarity. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

The approaches described herein allow sensors and other equipment to be uniquely identified by an URI or similar constructs (e.g., URL, IPv4 address, or IPv6 address to mention a few examples). These approaches allow any system component including individual sensors to be accessible within the context of the modern Internet using, for example, a URL, URI, IPv4 address, or IPv6 address. This enables machine-to-machine, machine-to-device, sensor-to-machine and sensor-to-sensor communications to be built on and leveraging existing communication channels and technology, thus eliminating the need for a separate infrastructure, such as a traditional SCADA system, to enable industrial Internet applications.

In one aspect, the present approaches provide interconnectivity between devices, machines and sensors in a scalable and secure fashion. This allows easier user interaction since a user does not have to remember complicated addresses or protocols. The present approaches are also easier to use since a user can access the appropriate URL from any terminal or interface that is connected to Internet.

In one example, I/O points can be associated with and available to a user as an URL/URI address. This reference and linkage allows for access to each I/O point individually. The URL can contain paths to resources hosted by the I/O point or fragments identifying the relevant section in the document object model (DOM) to allow users to access metadata about the instrument and its measured value. This provides knowledge to the user about current state. These approaches can be extended to the manipulation of set points and/or outputs.

In some aspects, each input point may use digital signatures to authenticate that requests for information originated from a known user. Each output also may require a digital signature to authenticate that a request to change or manipulate the output came from a known user with the required authorization to make changes to outputs.

In another example, an automation tag from a SCADA or Historian system can be associated with and available to a user as a URL/URI address. This association eliminates the translation step required from having a tag name and translating it to its network address. Simplifying the system in this way removes a level of abstraction. Users can use a simple web browser to display tag values or other information pertinent to a SCADA tag. Users could access information such as engineering units, diagnostics and alarms to mention a few examples. Any device (mobile or computer) that supports web based access could view this information.

As with I/O point associations, security may be provided. Additionally, this approach could be used to control the information. For example, users could move set points, manipulate the data, and so forth.

In another example, an automation object (digitally representing a pump, valve, or other automation equipment or object) may be associated with and available to users as a URL/URI.

In a Manufacturing Execution System (MES), this approach could extend to various forms and processes being made available. For example, a Shop Order may be available as an URL/URI.

Human Machine Interface (HMI) and SCADA system information could form process objects that represent equipment (i.e. pumps) and aggregate that information into a set of data that can be made available through a URL/URI. To take one example, different things, parts, or attributes that comprise a pump could be accessible such as motor temperatures, flow rate, speed, to mention a few examples.

As with I/O point and SCADA associations, security may be provided. Additionally, this approach could be used to control the information via the URL. For example, users could move set points, manipulate the data, and so forth.

It will be appreciated that in many of the examples described herein, URLs are associated with various entities. However, it will be understood that the approaches described herein are not limited to associations with URLs, but also include associations with URIs, IPv4 addresses, IPv6 addresses, or any construct that is easily remembered by a human user.

Referring now to FIG. 1, one example of an arrangement that links uniform resource locators (URLs) to industrial equipment is described. The system 100 includes a mobile unit 102, the Internet (or an intranet) 104, a display 106, a web server 108, an industrial controller 110, and a distributed I/O device 103. The web server 108, first industrial controller 110, and distributed I/O device 103 are coupled together via a communication network 112. The web server as represented in the drawings is shown as a distinct entity, but it may be an integrated component in the other hardware (any component including the web server and sensors to mention two examples).

The mobile unit 102 is in this example a portable unit that is coupled to the Internet 104 via either a wired or wireless connection. For example, the mobile unit 102 may be a cellular phone, lap top computer, tablet, or similar device.

The Internet 104 is the publically available Internet and includes servers, switches, routers, gateways, sub-networks, domain name services and so forth. The Internet 104 can instead be an intranet and localized to a particular company, school, building, or organization to mention a few examples.

The display 106 is a fixed screen and may be connected to a personal computer in one example. The web server 108 listens for requests coming over the Internet 104 that originate from clients 102 and 106. The web server 108 is shown as an individual entity, but it can be part of the Industrial Controller (110, 120, 122, 124), Distributed I/O (103, 130, 132) and/or Sensors (126, 136). Once the web server receives a request it responds by routing the requested resource, e.g. the measurement reading, given by the URI back to the client over the Internet 104. It is understood that in some approaches, the web server 108 may be an apparatus having an interface with at least one input and an output and a processor coupled thereto. Accordingly, the processor of the web server 108 may be configured to link a construct with an industrial data object by using the construct, receive a request via the input from an application (e.g. clients 102 and/or 106) to access the industrial data object by using the construct, and respond to the request by routing the industrial data object to the application via the output of the web server 108.

The industrial controller 110 includes a CPU 120, a first I/O card 122, and a second I/O card 124. The first I/O card 122 couples to a first temperature sensor 126. The distributed I/O device 103 includes a network interface 130, a third I/O card 132, and a fourth I/O card 134. The third I/O card 132 couples to a second temperature sensor 136.

The first temperature sensor 126 has a URL of Plant1.Unit1.temp, which translates to a resource accessible with the Internet address of 3.1.2.5. The second temperature sensor 136 has a URL of Plant1.Unit2.temp, which translates in one example to a resource accessible with the Internet address of 3.1.2.5. In this example, the second temperature sensor 136 has a reading of 67 degrees F.

The CPU 120 can act either as a gateway, a server, a router, or a switch to provide direct network access to devices on its backplane or through its remote interface connections such as Profibus or other field networks. The temperature sensors 126 or 136 could also be directly connected to the communication network 112, but in either case access looks exactly the same to other devices on the network.

It will be understood that the web server 108 translates the URL into an IP address. In one aspect, the actual sequence is that the URL is entered in the browser and an HTTP request is made from the browser. The Internet 104 has domain name services that resolve the URL in the request to an IP address, which is the address of the web server 108. In these approaches and in one example, the temperatures and other information are resources that the web server 108 can serve up to clients. The web server 108 listens for requests from clients and responds to those requests. URLs are a subset of URIs. The URI can contain location paths for specific resources that are accessible from the web server 108, such as current values or other metadata.

URLs are a subset of URIs. The URI can contain location paths for specific resources that are accessible from the web server 108, such as current values or other metadata.

In operation, a user at the mobile unit 102 or display 106 desires that the temperature of temperature sensor 136 be displayed. They enter the user/human-friendly URI Plant1.Unit2.temp. This initiates a request over the Internet 104 for the resource identified by the URI. The request is processed by the web server 108 and a response with the temperature reading is sent back to the mobile unit 102 or display 106. The devices 102 and 106 render the temperature reading.

Figure 2:
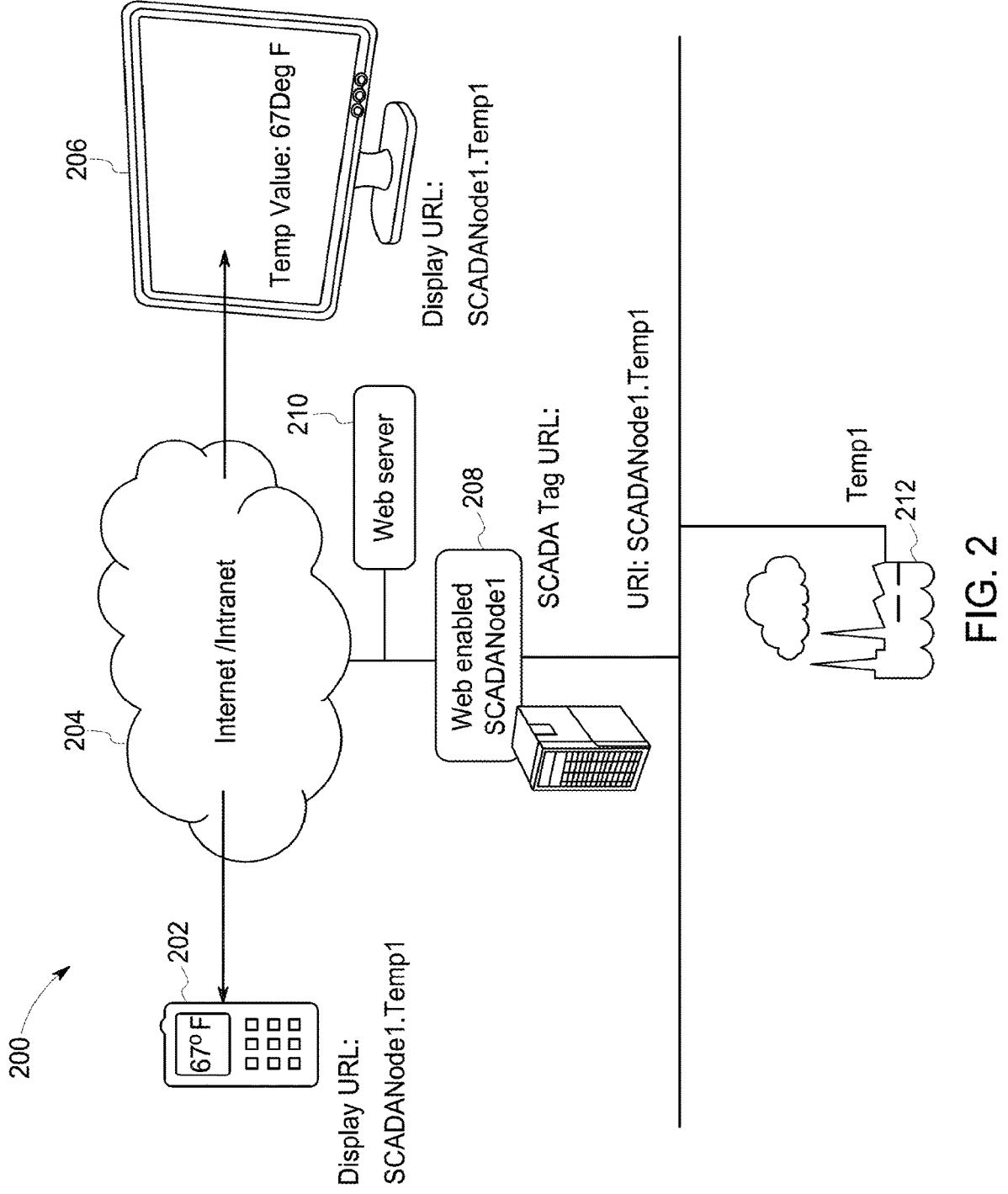
FIG. 2 comprises a block diagram of a system where URLs (or other similar constructs) are linked to various aspects of industrial processes according to various embodiments of the present invention.

Referring now to FIG. 2, another example of an arrangement that links uniform resource locators (URLs) to industrial equipment is described. The system 200 includes a mobile unit 202, the Internet (or intranet) 204, a display 206, a web-enabled Supervisory Control and Data Acquisition (SCADA) node or server 208, a web server 210, and a SCADA temperature sensor 212 (represented by a SCADA tag Temp1).

The mobile unit 202 is in this example a portable unit that is coupled to the Internet 204 via either a wired or wireless connection. For example, the mobile unit 202 may be a cellular phone, lap top computer, tablet, or similar device.

The Internet 204 is the publically available Internet and includes servers, switches, routers, gateways, sub-networks, domain name services and so forth. The Internet 204 can instead be an intranet and localized to a particular company, school, building, or organization to mention a few examples.

The display 206 is a fixed screen and may be connected to a personal computer in one example. The domain name services converts URLs into IP addresses in order to route messages across the Internet 204 to the appropriate server.

The temperature sensor 212 has a URL of SCADANode1.Temp1 (which translates in one example to an Internet address of 3.26.4.1). In operation, a user at the mobile unit 202 or display 206 desires that the temperature of temperature sensor 212 be displayed. The user enters the user/human-friendly URI of SCADANode1.Temp1. This initiates a request over the Internet 204 for the resource identified by the URI.

SCADA server 208 is configured and programmed to receive requests over the internet for resources (e.g. the value of a SCADA tag) that it hosts. The server responds to the request with information indicating the temperature measured by the temperature sensor 212. This information is sent back via the web server 210, across the Internet 204, to the display 206 or mobile unit 202. Once reaching the display 206 or mobile unit 202, the information is rendered to the user.

Figure 3:
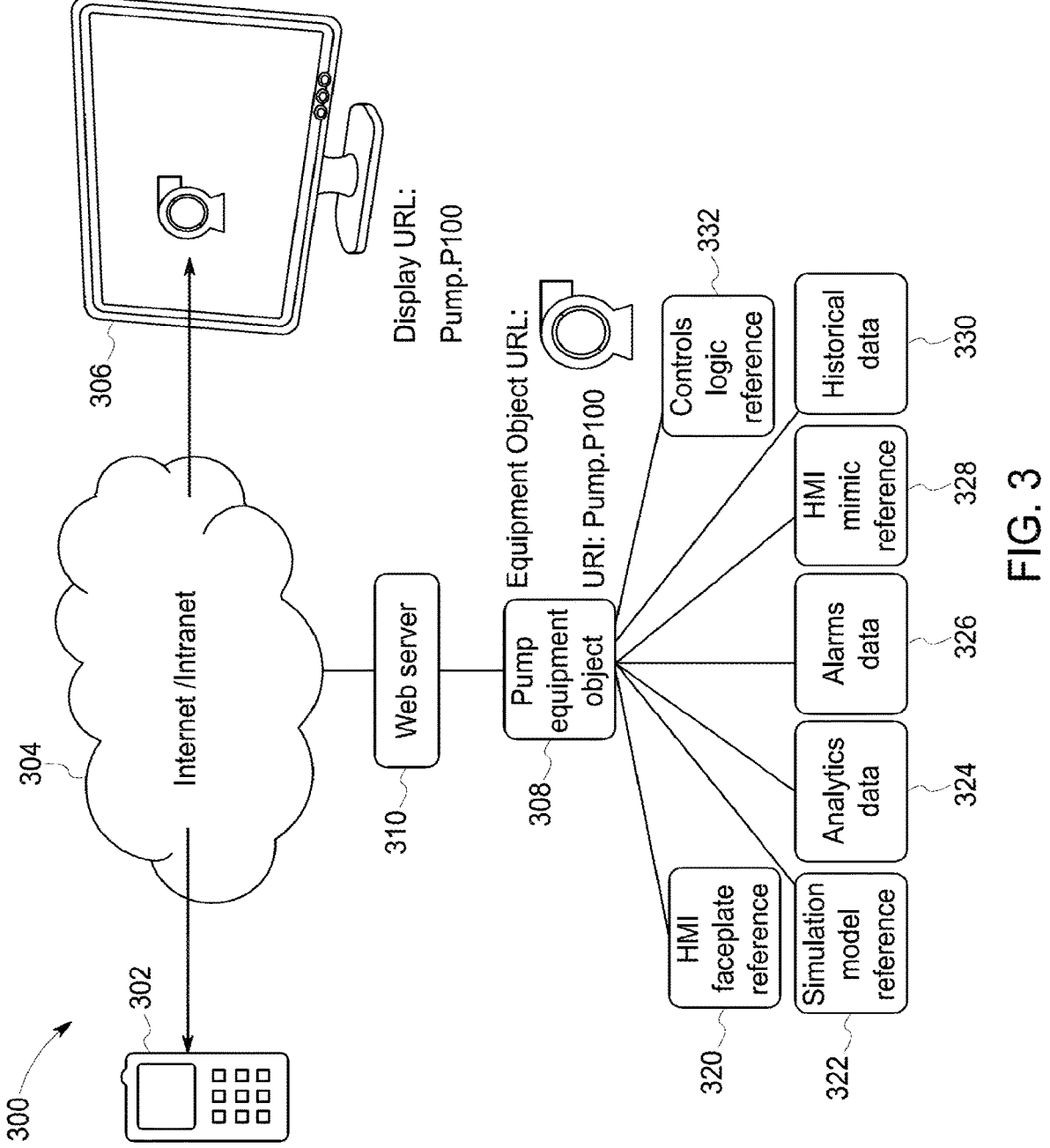
FIG. 3 comprises a block diagram of a system where URLs (or other similar constructs) are linked to various aspects of industrial processes according to various embodiments of the present invention.

Referring now to FIG. 3, still another example of an arrangement that links uniform resource locators (URLs) to industrial equipment is described. The system 300 includes a mobile unit 302, the Internet (or intranet) 304, a display 306, a web-enabled equipment object 308, and a web server 310. The equipment object (in this example, a pump), is a complex piece of equipment that has several attributes 320-332. The attributes are discussed in greater detail below.

The mobile unit 302 is in this example is a portable unit that is coupled to the Internet 304 via either a wired or wireless connection. For example, the mobile unit 302 may be a cellular phone, lap top computer, tablet, or similar device.

The Internet 304 is the publically available Internet and includes servers, switches, routers, gateways, sub-networks, and so forth. The Internet 304 can instead be an intranet and localized to a particular company, school, building, or organization to mention a few examples.

The display 306 is a fixed screen and may be connected to a personal computer in one example. The web server 310 listens for requests from clients via the internet.

The equipment object 308 is a complex piece of equipment that has a web interface configured and programmed to receive requests over the internet for resources that it hosts. The equipment object 308 may itself have a URL, in this case Pump.p100 that translates in one example into IP address of 3.26.4.1. As mentioned, the equipment object has its own attributes including a HMI faceplate reference 320, a simulation model reference 322, analytics data 324, alarm data 326, HMI Mimic reference 328, Historical data 330, and controls logic reference 332. It will be appreciated that each of these attributes may have its own unique URI given by a specific location path. It will also be understood that other attributes are possible.

The HMI faceplate reference 320 is a small graphical interface. In one example, it is a graphical representation of the control interface (e.g., showing knobs).

The simulation model reference 322 is a digital representation of a model. A user can use the model to test hypothetical inputs to see the output without using the real device (e.g., the real pump).

The analytics data 324 represents key performance indicators. For example, temperature and pressure may represent key performance indicators. The analytics data 324 may indicate the value of these indicators as well.

The alarm data 326 represents run-time data representing potentially adverse conditions. For example, a low flow condition may be indicated by this data.

The HMI Mimic reference 328 is a graphical representation of an object that may also be used to indicate condition. In one example, this may be a pump icon that changes colors based upon the condition of the pump.

The Historical data 330 represents historical run-time data of the system. For example, values of sensors over time may be shown.

The controls logic reference 332 is control logic for the industrial equipment. For example, this may represent a particular algorithm regarding pump operation.

In operation, a user at the mobile unit 302 or display 306 desires that an attribute be displayed. They enter the user/human-friendly URI of Pump.p100.mimic for the mimic object associated with the pump.—This initiates a request for the mimic object resource that is routed to the web interface 310. Upon receipt of the request, the web interface 310 responds by sending the mimic object resource, back across the Internet 304, to the display 306 or mobile unit 302. Once reaching the display 306 or mobile unit 302, the information is rendered to the user.

It will be appreciated that the present approaches can be used to display existing information or readings of sensors or other measurement devices. Additionally, the approaches can be used to actuate devices, processes, or otherwise alter the operation of a physical entity. For example, a user at any of the mobile devices may enter a URL to change a set point (a desired condition) of a process or device. For example, a certain URL can be used to change the set point temperature of a machine. Another URL can be used to influence the position of a valve.

Figure 4:
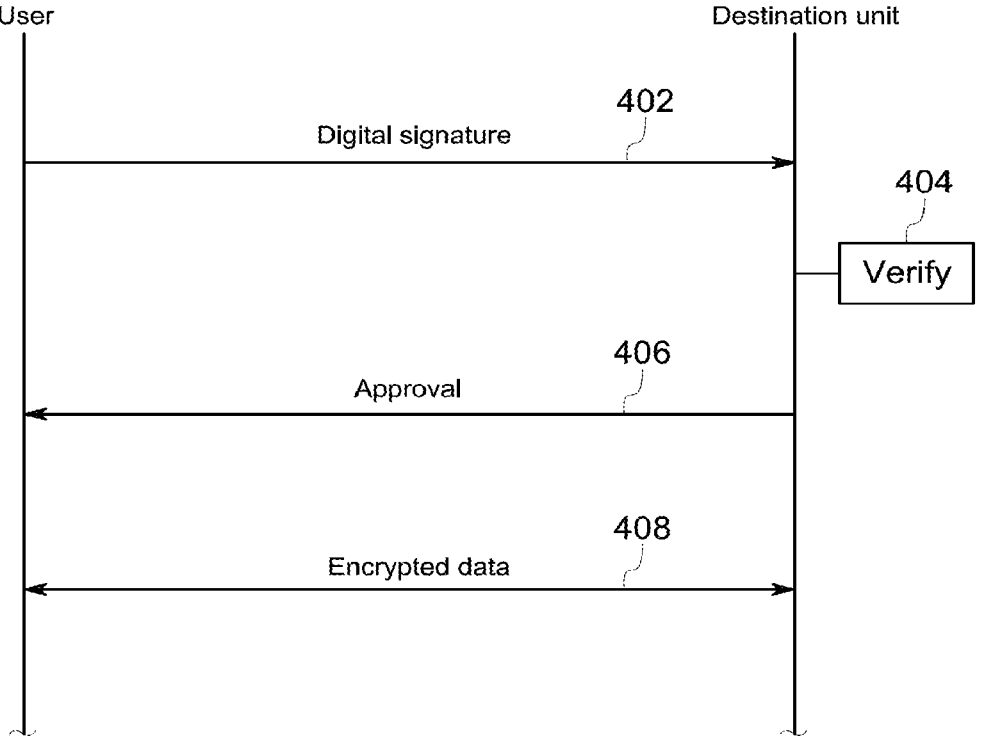
FIG. 4 comprises a block diagram of an approach for providing security in a system where URLs (or other similar constructs) are linked to various aspects of industrial processes according to various embodiments of the present invention.

Referring now to FIG. 4, one example of addressing security issues using the present approaches is described. These approaches can be used at one of the mobile unit or terminal so that a user at one of these devices can access or alter a process by using the URL-based approaches described herein. In one aspect, the user asks for and receives permission to access the industrial process before they are allowed to proceed.

At step 402, the user sends a digital signature from their device to the unit that is the destination unit (e.g., the input point, the SCADA server, or the equipment object). At step 404, the destination unit verifies the signature is valid. At step 406, the destination unit sends approval to the user. At step 408, the user sends encrypted data to the destination unit.

It will be appreciated by those skilled in the art that modifications to the foregoing embodiments may be made in various aspects. Other variations clearly would also work, and are within the scope and spirit of the invention. It is deemed that the spirit and scope of that invention encompasses such modifications and alterations to the embodiments herein as would be apparent to one of ordinary skill in the art and familiar with the teachings of the present application.

What is claimed:

1. A method, comprising:

linking, by a processor, a construct with a particular automation tag from among a plurality of automation tags of a Supervisory Control and Data Acquisition (SCADA) system or a plurality of automation tags stored in a data historian system, the construct comprising a semantic construct that identifies a specific attribute value hosted by the automation tag, and the automation tag corresponding to at least one of an attribute or a plurality of attributes within a device, or a property within an object the value of which is used in the SCADA system to perform control;

receiving a request from an application to access the automation tag by using the construct;

translating, by the processor, the construct into an internet protocol (IP) address;

responding at the direction of the processor to the request by routing the value of the specific attribute hosted by the automation tag to the application;

using a first digital signature to authenticate the request; and using a second digital signature to authenticate a change or manipulation to an output of the request.

2. The method of claim 1, wherein the IP address is associated with a particular I/O point, and wherein the I/O point is associated with a set point and the set point is changeable.

3. The method of claim 1, wherein the particular automation tag is one of a plurality of automation tags the data historian system associated with the industrial process.

4. The method of claim 1, wherein the IP address is associated with a particular I/O point.

5. The method of claim 1, wherein the particular automation tag is one of a plurality of automation tags of a SCADA system.

6. An apparatus, comprising:

an interface having at least one input and an output; and a processor coupled to the interface;

wherein the processor is configured to:

link a construct with a particular automation tag from among a plurality of automation tags of a Supervisory Control and Data Acquisition (SCADA) system or a data historian system, receive a request via the input from an application to access the automation tag by using the construct, translate the construct into an internet protocol (IP) address, respond to the request by routing the automation tag to the application via the output;

using a first digital signature to authenticate the request; and using a second digital signature to authenticate a change or manipulation to an output of the request.

7. The apparatus of claim 6, wherein the construct comprises at least one of an Internationalized Resource Identifier (IRI), a uniform resource identifier (URI), a uniform resource locator (URL), an IPV4 address, an IPV6 address, an IPV6 address associated with an IEEE 64 bit extended address, or a 16 bit address unique to a local Personal Area Network (PAN).

8. The apparatus of claim 6, wherein the automation tag corresponds to at least one of a device, an attribute or a plurality of attributes within a device, or a property within an object.

9. The apparatus of claim 8, wherein the device comprises at least one of a sensor, an actuator, or a controller.

10. The apparatus of claim 6, wherein the processor is further configured to request and receive permission to access the device.

11. The apparatus of claim 6, wherein the IP address is associated with particular I/O point, and wherein the I/O point is associated with a set point and the set point is changeable.

12. The apparatus of claim 6, wherein the application comprises at least one of a client-based application or a web-based server.

13. The apparatus of claim 6, wherein the particular automation tag is one of a plurality of automation tags in the data historian system associated with the industrial process.

14. The apparatus of claim 6, wherein the IP address is associated with the particular I/O point.

15. The apparatus of claim 6, wherein the particular automation tag is one of a plurality of automation tags of a SCADA system.

\* \* \* \* \*